United States Patent [19]

Izutu et al.

[11] 4,105,622

[45] Aug. 8, 1978

[54] PROCESS FOR THE PREPARATION OF FLAME RETARDANT THERMOPLASTIC RESIN COMPOSITIONS

[75] Inventors: Hitoshi Izutu, Osaka; Ryoichi Ishikawa, Takaishi, both of Japan

[73] Assignee: Dainippon Inc. & Chemicals Inc., Tokyo, Japan

[21] Appl. No.: 721,327

[22] Filed: Sep. 7, 1976

[30] Foreign Application Priority Data

Mar. 22, 1976 [JP] Japan .................................. 51-29867

[51] Int. Cl.$^2$ ...................... C08G 18/34; C08K 3/40; C08K 3/10; C08K 3/34
[52] U.S. Cl. ............................ 260/37 N; 260/45.8 A; 260/75 NP; 260/858; 260/830 P
[58] Field of Search ........ 260/75 NP, 77.5 R, 2.5 BB, 260/830 P, 45.8 A, 2.5 AK, 37 N

[56] References Cited

U.S. PATENT DOCUMENTS

| | | | |
|---|---|---|---|
| 3,148,167 | 9/1964 | Keplinger | 260/45.8 A |
| 3,264,233 | 8/1966 | Trescher et al. | 260/75 NP |
| 3,359,218 | 12/1967 | Wiles | 260/75 NP |
| 3,525,779 | 8/1970 | Hawkins | 260/830 P |
| 3,625,872 | 12/1971 | Ashida | 260/2.5 AK |
| 3,629,167 | 12/1971 | Allen et al. | 260/830 P |
| 3,775,355 | 11/1973 | Jellinek et al. | 260/45.8 A |
| 3,884,849 | 5/1975 | Molbert | 260/2.5 BB |
| 3,916,060 | 10/1975 | Fish et al. | 260/2.5 AK |

OTHER PUBLICATIONS

Encyclopedia of Polymer Science & Technology, vol. 5, John Wiley (Interscience) N.Y., 1966, pp. 430–435.
Whittington's Dictionary of Plastics, Technomic Publ. Co., Stamford, CT (USA) 06902, pp. 85–86.

*Primary Examiner*—H.S. Cookeram
*Attorney, Agent, or Firm*—Sherman & Shalloway

[57] ABSTRACT

A process for preparing a flame retardant thermoplastic resin composition which comprises heat mixing and kneading 100 parts by weight of a mixture consisting of a hydroxyl-terminated low molecular weight thermoplastic polyester (A) and a polyfunctional isocyanate (B), or a reaction product of (A) and (B), with 1.5 – 25 parts by weight, calculated as halogen, of a specific halogenated epoxy compound, 0.3–15 parts by weight, calculated as antimony, of an antimony compound, and, as the case may be, 0–10 parts by weight of asbestos, and/or 0–60% by weight, based on the total weight of the resin composition obtained, of glass fibers.

20 Claims, No Drawings

PROCESS FOR THE PREPARATION OF FLAME RETARDANT THERMOPLASTIC RESIN COMPOSITIONS

This invention relates to a process for the preparation of flame retardant thermoplastic resin compositions. More particularly, this invention relates to a process for preparing a flame retardant thermoplastic resin composition by heat mixing and kneading a mixture, or a reaction product, of a hydroxyl-terminated low molecular weight thermoplastic polyester and a polyfunctional isocyanate, with a halogenated epoxy compound, an antimony compound and, as the case may be, asbestos and/or glass fibers.

The thermoplastic polyesters, and especially polyethylene terephthalate and polybutylene terephthalate, are superior in their mechanical properties, heat resistance, resistance to attack by chemicals and electrical properties. Hece, these polyesters are attracting attention in recent years as being well-balanced enginerring plastics. Of these polyesters, polybutylene terephthalate is especially preferred because of its fast crystallization speed and excellent moldability. However, as in the case with many of the other thermoplastic resins these thermoplastic polyesters have the shortcoming that they are flammable. Hence, it is strongly desired that they be made flame retardant. The flameproofing of a thermoplastic resin can usually be accomplished readily by uniformly dispersing and mixing a so-called additive type flame retarding agent in the resin. This likewise applies in the case of such thermoplastic polyesters as, for example, polybutylene terephthalate. However, when a flame retardant thermoplastic polyester is to be obtained by the use of this additive type flame retarding agent, there are such drawbacks as (1) that unless the amount added of the flame retarding agent is great, the flame retardant effect is not sufficient; (2) that the compatibility of the flame retarding agent and the polyester is poor or that since the flame retarding agent and the polyester are not chemically bound, there is brought about a great decline in the physical properties that are inherently possessed by the polyesters; (3) that the flame retarding agent makes its way to the surface of the molded product for the reasons given in (2), above, to impair the appearance of the molded product or that when the product is held at an elevated temperature exceeding room temperature, there is a drastic decline in the flame retardancy due to the dissipation of the flame retarding agent; (4) that the flame retarding agent decomposes during the processing steps to cause a great decline in the physical properties of the polyester; and (5) that in consequence of the decomposition of the flame retarding agent there is a decline in the rate of retention of the heat resistant strengths.

Of the foregoing drawbacks, those of especially (2) and (3) can be overcome by the use of the so-called reaction type flame retarding agent. That is to say, it is possible to employ a process of obtaining a flame retardant thermoplastic polyester by copolymerizing either a halogenated glycol or a halogenated dicarboxylic acid at the time of polycondensing the thermoplastic polyester. This process is however an extremely difficult one in actual practice. Since the temperature at which the polycondensation of polyesters is carried out is usually 200°–300° C., the foregoing halogenated copolymeric component becomes unstable, and there is a marked impairment of the polycondensation reaction, because the decomposition of the polyester is accelerated as a result of, say, the elimination of the hydrogen halide. Moreover, a considerable amount of the halogenated copolymeric component is necessary for imparting a sufficient flame retardancy, with the consequence that there is a marked decline in the melting point and heat distortion temperature of the flame retardant thermoplastic polyester produced as well as a great decline in its resistance to attack by chemicals.

In consequence of our extensive researches with a view to solving the foregoing difficulties pertinent to making the thermoplastic polyesters flame retardant, we found that by using as the thermoplastic polyester a hydroxyl-terminated thermoplastic polyester having a hydroxyl value of from 7 to 40 (hereinafter referred to as relatively low molecular weight polyester) in admixture with a polyfunctional isocyanate, or a reaction product of them, and by choosing as the reaction type flame retarding agent a halogenated epoxy compound it was possible to easily obtain a flame retardant polyester composition excelling in mechanical strength, heat resistance, moldability, nondissipativeness of the flame retarding agent and resistance to attack by chemicals.

Thus, the present invention intends to provide a process for preparing a flame retardant thermoplastic resin composition which comprises heat mixing and kneading 100 parts by weight of a mixture consisting of a relatively low molecular weight thermoplastic polyester (A) and a polyfunctional isocyanate (B), or a reaction product thereof, with 1.5–25 parts by weight, calculated as halogen, of a halogenated epoxy compound of the formula

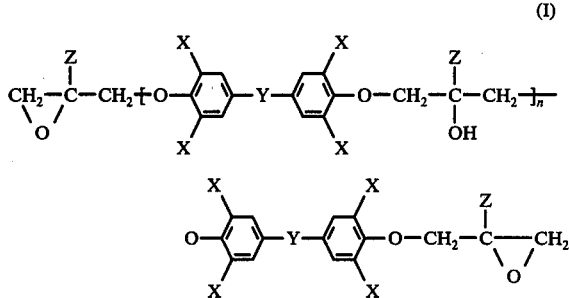

wherein X is either hydrogen, chlorine or bromine, Y is either an alkylidene group of 1-6 carbon atoms, cycloalkylidene, —S—, —SO—, —SO$_2$—, or —O—, Z is hydrogen or methyl, and n is 0–15, 0.3—15 parts by weight, calculated as antimony, of an antimony compound, 0–10 parts by weight of asbestos and 0–60% by weight, based on the total weight of the resin composition obtained, of glass fibers.

The process of the present invention differs from the conventional techniques in which there is generally employed a method of choosing and adding to the thermoplastic polyester a suitable flame retarding agent whose addition brings about the least possible decline in the physical properties of the thermoplastic polyesters, and is a unique process in that it is directed to modifying the thermoplastic polyester itself so as to be suitable for rendering it flame retardant.

In the present invention, a hydroxyl-terminated low molecular weight thermoplastic polyester (A) and a polyfunctional isocyanate (B) can be used as merely a mixture, or it can also be used as a chain extended reaction product by carrying out the chain extension of the relatively low molecular weight polyester with the polyfunctional isocyanate at 200°-300° C. The chain extension can be readily accomplished by the method described in, say, Japanese Laid-Open Patent Application No. 99741/74.

As the relatively low molecular weight polyesters (A) to be used in the present invention, there can be named such aromatic polyesters as, for example, polyethylene terephthalate, polyethylene-2,6-naphthalate, polypropylene terephthalate, polybutylene terephthalate, polybutylene-2,6-naphthalate and polycyclohexanedimethylene terephthalate. Usable also are these aromatic polyesters with which have been compolymerized a polycarboxylic acid such as, for example, isophthalic acid, adipic acid, sebacic acid and trimellitic acid and/or a polyhydric alcohol such as, for example, ethylene glycol, propylene glycol, butylene glycol, diethylene glycol, triethylene glycol, pentamethylene glycol, hexamethylene glycol, glycerol, trimethylolpropane, pentaerythritol and the alkylene oxide adduct of bisphenol A. Of these relatively low molecular weight polyesters (A), especially preferred is polybutylene terephthalate because of its relatively low melting point which makes it possible to lower the extrusion temperature, with the consequence that the decomposition of the halogenated epoxy compound, the flame retarding agent can be reduced and, in addition, since the resulting flame retardant polyester composition possesses superior physical properties in a well-balanced manner.

Further, it is preferred that the relatively low molecular weight polyester (A) be one whose ends are almost all occupied by hydroxyl groups and that the amount of the carboxyl groups be as small as possible. Practically, said low molecular weight polyester is suitably one whose intrinsic viscosity (measured in a 6:4 solvent mixture of phenol and tetrachloroethane at 30° C., this to apply equally hereinafter) is 0.15–0.6 dl/g and hydroxyl value (the number of milligrams of potassium hydroxide required to neutralize one gram of specimen) is 7–40, and more preferably one whose intrinsic viscosity is 0.25–0.5 dl/g and hydroxyl value is 9–29. If, in this case, the hydroxyl value is less than 7, the amount added of the polyfunctional isocyanate used becomes less to result in a reduction in the amount reacted of the halogenated epoxy compound, with a consequence that a marked decline takes place in the physical properties of the resulting flame retardant thermoplastic polyester. On the other hand, when the hydroxyl value exceeds 40, this also is undesirable, since the amount added of the polyfunctional isocyanate becomes great, with the consequence that the resulting thermoplastic polyester becomes one whose properties depart from those inherently possessed by the thermoplastic polyesters. Hence, there is a possibility that the objects of the invention cannot be achieved.

The polyfunctional isocyanates (B) usable in this invention include such aliphatic, alicyclic and aromatic diisocyanates as, for example, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate,, propane diisocyanate-1,2, butane diisocyanate-1,2, pentane diisocyanate-1,2, pentane diisocyanate-1,3, hexane diisocyanate-1,2, hexane diisocyanate-1,3, hexane diisocyanate-1,4, hexane diisocyanate-1,5, 4-methylhexane diisocyanate-1,2,3-methylhexane diisocyanate-1,4, 2-benzyl-propane diisocyanate-1,3, 2,4-diphenylhexane diisocyanate-1,6, methylcyclohexane diisocyanate, 4,4'-dicyclohexymethane diisocyanate, isopropylidene bis(4-cyclohexylisocyanate), p-phenylene diisocyanate, m-phenylene diisocyanate, 4,4'-diphenyl diisocyanate, 1,4-naphthylene diisocyanate, 1,5-naphthaylene diisocyanate, 1,8-naphthylene diisocyanate, 2,6-naphthylene diisocyanate, 1-methyl-phenylene diisocyanate-2,4, 1-methyl-phenylene diisocyanate-2,6, xylylene diisocyanate-1,3,-xylylene diisocyanate-1,4, 4,4'-diisocyanate diphenyl ether, 2,2'-diisocyanate diethyl ether, 2,2'-diisocyanate diethyl sulfite, 4,4'-diisocyanate diphenylmethane, hydrogenated 4,4'-diisocyanate diphenylmethane and isophorone diisocyanate; as well as 1-methyl-phenylene diisocyanate-2,4 dimer and 1-methyl-phenylene diisocyanate-2,6 dimer. Further the polyisocyanate having 3 or more isocyanate groups in their molecular structure, e.g., triphenylmethane-4,4', 4"-triisocyanate and crude 4,4'-diisocyanatediphenylmethane can be used in conjunction with the hereinbefore-indicated polyfunctional isocyanates. Of these, the purified diphenylmethane diisocyanates are most preferred in view of their reactivity and safety.

The foregoing polyfunctional isocyanate is suitably used in an amount, based on 100 parts by weight of the relatively low molecular weight polyester, calculated as follows:

$$\frac{(0.8-2.5) \times (\text{isocyanate equivalent of polyfunctional isocyanate (B)})}{(\text{hydroxyl equivalent of relatively low molecular weight polyester (A)})}$$

× 100 parts by weight. (The isocyanate equivalent, as here used, is the molecular weight of the polyfunctional isocyanate per isocyanate group, while the hydroxyl equivalent, as here used, is the molecular weight of the relatively low molecular weight polyester per hydroxyl group.)

Of the 100 parts by weight of the mixture or reaction product consisting of a relatively low molecular weight polyester (A) and a polyfunctional isocyanate (B), up to 30% by weight of the polyester can be substituted by other organic polymers in carrying out the present invention.

The halogenated epoxy compound used in this invention is a compound having the general formula

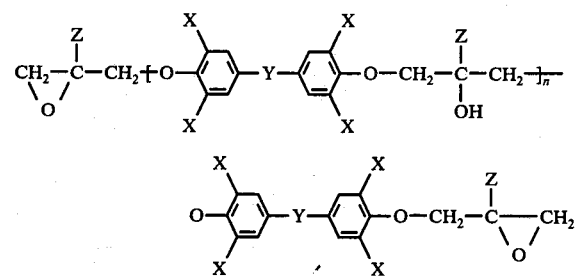

wherein X is either hydrogen, chlorine or bromine, Y is either an alkylidene group of 1–6 carbon atoms, cycloalkylidene, —S—, —SO—, —SO$_2$—, or —O—, Z is hydrogen or methyl, and $n$ is an integer 0–15, preferably 1–12.

This epoxy compound can be readily obtained by either of such methods as, say, that of condensing a compound of the formula

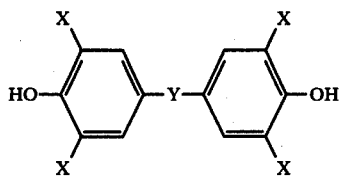

wherein X and Y are as hereinabove defined, with epichlorohydrin and/or methylepichlorohydrin or that of reacting a compound of the formula

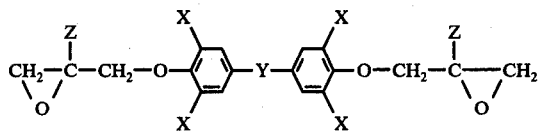

wherein X, Y and Z are as hereinabove defined, with a compound of the formula

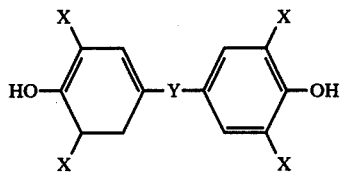

wherein X and Y are as hereinabove defined. If the foregoing epoxy compound is shown by a more specific general formula, it is as follows:

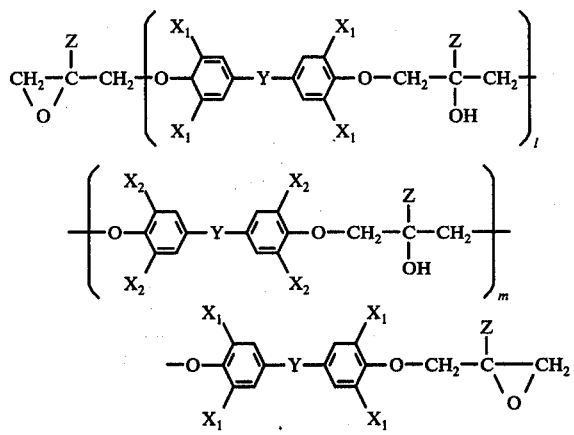

wherein $X_1$ is either hydrogen, chlorine or bromine, with the limitation that when $l$ and $m$ are zero, it is either chlorine or bromine, $X_2$ is either chlorine or bromine, and Y and Z are as hereinbefore defined, the sum of $l$ and $m$ being an integer of from 0–15, preferably 1–12.

This compound is used in an amount, calculated as halogen, of 1.5–25 parts by weight, and preferably 3–22 parts by weight, based on 100 parts by weight of the mixture or reaction product of the relatively low molecular weight polyester and the polyfunctional isocyanate. When this amount is less than 1.5 parts by weight, a high degree of flame retardancy cannot be obtained. On the other hand, an amount exceeding 25 parts by weight is also undesirable, since the physical properties inherently possessed by the thermoplastic polyester are impaired.

As the antimony compound to be used in the present invention, there can be named such, for example, an antimony pentoxide, antimony trioxide, antimony trisulfide, antimony trichloride, and antimony pentachloride, antimony tribromide, antimony pentabromide, of which especially to be preferred is antimony trioxide. The antimony compound is used in an amount of 0.3–15 parts by weight, and preferably 0.5–13 parts by weight, per 100 parts by weight of the mixture or reaction product of the relatively low molecular weight polyester (A) and the polyfunctional isocyanate (B). When this compound is added in an amount less than 0.3 part by weight, a high degree of flame retardancy cannot be obtained. On the other hand, when the amount exceeds 15 parts by weight, this also is undesireable, since the mechanical properties and heat resistance of the resulting flame retardant thermoplastic resin composition suffer. When the antimony compound used is one containing a halogen, the amount of halogen contained in the antimony compound is combined with that contained in the halogenated epoxy compound when making the calculation of the amount to be used of the latter.

Asbestos, which is usable in the present invention, has the effect of preventing dripping when the shaped article burns. It is used in an amount not exceeding 10 parts by weight, and preferably 1–7 part by weight, per 100 parts by weight of the mixture of reaction product of the relatively low molecular weight polyester (A) and the polyfunctional isocyanate (B). The use of the asbestos in an amount in excess of 10 parts by weight is not desirable, since no further improvement is had in the effect of preventing dripping by the use of asbestos in such excess. Furthermore, there is a decline in the other properties of the resinous composition.

While the thermoplastic resin composition rendered flame retardant obtained by the present invention is valuable even without the incorporation of glass fibers, the incorporation of glass fibers is desirable in view of such effects as the reinforcement of the products obtained from the composition. Preferred as such glass fibers are those of 1–30 millimeters in length, which are incorporated in an amount of 0–60% by weight, and preferably 10–50% by weight, based on a whole amount of the composition. The incorporation of the glass fibers in an amount in excess of 60% by weight is undesirable, because the moldability of the flame retardant thermoplastic resin composition becomes unsatisfactory.

It is known to obtain a flame retardant thermoplastic polyester by incorporating in a flammable polyester-,especially the fiber glass reinforced polybutylene terephthalate, the halogenated epoxy resin that is used in the present invention. However, when a comparison is made between the case of known art where there is used as the thermoplastic polyester one having an intrinsic viscosity [η] of 0.7–1.2 dl/g (e.g. polybutylene terephthalate) and the case of the invention where there is used a polymer obtained by transforming a relatively low molecular weight polyester (intrinsic viscosity of 0.15–0.6 dl/g) into a high polymer with a polyfunctional isocyanate or a mixture of a relatively low molecular weight polyester and a polyfunctional isocyanate, there is basically a great difference between the two cases. In the former case the effect of the halogenated epoxy compound is merely that of an additive type flame retarding agent, whereas in the latter case the isocyanate resulting from the dissociation of the urethane bond reacts with the hydroxyl group of the halogenated epoxy compound and/or the terminal epoxy group of the halogenated epoxy compound reacts with active hydrogen atom of the urethane bond so that the halogenated epoxy compound as the flame retarding agent and the polymer that has been transformed into a high polymer are chemically bound to form either a graft or block polymer. This is apparent from the fact that when the flame retardant thermoplastic resin composition is submitted to a Soxhlet extraction under reflux until a constant weight is reached, using toluene, a solvent for the halogenated epoxy compound, a major proportion of the flame retarding agent is extracted in the case of the compositions of the conventional methods, whereas the amount of the flame retarding agent extracted in the case of the composition of the present invention process is negligible.

Hence, in the case of the composition prepared by incorporating a halogenated epoxy compound as flame retarding agent into a thermoplastic polyester not modified by means of a polyfunctional isocyanate, the flame retarding agent demonstrates only effect of an additive type flame retarding agent and, consequently, there is noted a decline in the mechanical properties, the heat resistance and moldability that are inherently possessed by the thermoplastic polyesters. Another serious drawback was that the flame retarding agent could be extracted with the usual organic chemicals such as toluene. On the other hand, in the composition of the present invention the halogenated epoxy compound is bound to the thermoplastic polyester through the medium of the polyfunctional isocyanate to become trasformed into either a block or graft polymer, with the consequence that there is no decline in the mechanical strengths that are inherently possessed by the thermoplastic polyester. as a result of the addition of the flame retarding agent. Furthermore, the heat resistance and moldability are improved and, in addition, the resistance to attack by chemicals is also improved in that the flame retarding agent is not extracted by means of such organic chemicals as toluene.

In practicing the process of the present invention, the starting materials are first premixed and then heat-mixed and kneaded. By such treatment a reaction takes place between the halogenated epoxy compound and either the mixture or reaction product consisting of the relatively low molecular weight polyester and the polyfunctional isocyanate and, at the same time, the uniform dispersion of the antimony compound and, as the case may be, the asbestos and/or glass fibers are effectively carried out. While it is possible to use one which has been transformed into a high polymer by reacting the relatively low molecular weight polyester with the polyfunctional isocyanate in advance, this need not be necessarily done. For instance, it is also possible to practice a procedure wherein the chain extension of the relatively low molecular weight polyester by the polyfunctional isocyanate is effected in the heat mixing and kneading step while the halogenated epoxy compound is also reacted therewith and, while the halogenated epoxy compound is also reacted therewith and, at the same time, the antimony compound and, as the case may be, asbestos and/or the glass fibers are uniformly dispersed in the reaction product. In adopting the foregoing two methods, the class and amount added of the halogenated epoxy compound to be used in this invention are suitably chosen in accordance with the class of the relatively low molecular weight polyester and its hydroxyl value, the class and amount added of the polyfunctional isocyanate and the heat mixing and kneading conditions. When the composition of the starting materials and the mixing and kneading conditions are chosen so that the reaction between one mole of the halogenated epoxy compound used and three or more moles of the polyfunctional isocyanate cannot be ignored, it is preferred that the low molecular weight polyester be rendered into a high polymer by reacting the relatively low molecular weight polyester and the polyfunctional isocyanate in advance in order to prohibit the occurence of a three-dimensional reaction.

Further, in this invention the hydroxyl group of the halogenated epoxy compound and the isocyanate group of the polyfunctional isocyanate react at the time of the heat mixing and kneading operation. Hence, the addition of a known polyurethanation catalyst is a preferred practice so as to make it possible to adjust the reaction as desired. As this polyurethanation catalyst, mention can be made of such compounds as, for example, 1,4-diazabicyclo-(2,2,2)-octane, N,N,N',N',N"-pentamethyldiethyltriamine, N,N-dimethylcyclohexylamine, N-methyldicyclohexylamine, N,N,N',N"-tetramethylpropylenediamine, triethylamine, N,N,N',N'-tetramethylhexamethylenediamine, N-methylmorpholine, N-ethylmorpholine, N,N-dimethylethanolamine, N,N-diethylethanolamine, 1,8-diazabicyclo(5,4,0) undecene-7 and the salts thereof, stannous octate, dibutyltin oxide, cobalt naphthenate, stannous chloride, tetra-n-butyl tin, stannic chloride, trimethyltin hydroxide and dimethyltin dichloride. This catalyst is suitably added in an amount of 0.001–2% by weight per 100 parts by weight of the halogenated epoxy compound.

The heat mixing and kneading in this invention is carried out by means of an apparatus which can cause the reaction between the relatively low molecular weight polyester and the polyfunctional isocyanate and the reaction between the reaction product thereof and the halogenated epoxy compound to take place, and moreover, in which the antimony compound and, as the case may be, the glass fibers and/or asbestos can be uniformly mixed. Specifically, most preferred is the use of an extruder for this purpose, and a barrel temperature of 200°–300° C., and preferably 205°–260° C., is adopted. While the dwell time of the starting materials inside the extruder is greatly influenced by the classes and amounts added of the polyfunctional isocyanate and the halogenated epoxy compound, and the barrel temperature of the extruder, usually a dwell time of 0.2–20 minutes, and preferably 0.4–10 minutes, is suitable. When the dwell time is shorter than 0.2 minute, the reaction of the halogenated epoxy compound does not take place sufficiently. On the other hand, when 20 minutes is exceeded, this also is undesirable, since the decomposition of the halogenated epoxy compound becomes excessive.

Especially in the case where an extruder is to be used, considerations must be given to the following points in its selection. First, in such cases where the mixing and kneading performance of the extruder is exceedingly poor, the reaction between the mixture or reaction product of the relatively low molecular weight polyester and the polyfunctional isocyanate and the halogenated epoxy compound becomes inadequate and, moreover, the dispersion of the antimony compound as well as the asbestos and/or glass fibers that may be used as the case may be becomes unsatisfactory. Secondly, in such cases where the mixing and kneading performance of the extruder is extremely good, there is the drawback that there occurs an excessive cutting of the glass fibers at the time of the mixing and kneading operation of result in the mechanical properties of the shaped article not being achieved to the desired degree. Thus, most suitable in the case where glass fibers are to be used is an extruder in which reaction or dispersion of the starting materials used is good and, in addition, the mixing and kneading performance is effected such that the glass fibers having lengths of 0.1–2 millimeters are uniformly dispersed in the resulting resin composition. Again, it is an advantage to use an extruder provided with a vent for removal of bubbles.

The composition of this invention may be incorporated with such additives as crystal nucleating agents, fillers, pigments, dyes, plasticisers, mold release agents, lubricants, thermal stabilizers, ultraviolet absorbents, blowing agents, coupling agents, etc. The antimony compounds, asbestos and glass fibers that are usable in this invention may be added at the time of the synthesis of the relatively low molecular weight polyester or at the time of the reaction of the relatively low molecular weight polyester and the polyfunctional isocyanate or subsequent to these reactions.

The flame retardant thermoplastic resin composition obtained by this invention can be molded by the usual molding procedures, i.e., injection molding, extrusion molding and compression molding.

The following Examples and Controls will serve to more fully illustrate the present invention.

REFERENTIAL EXAMPLE

Synthesis of a high polymer of glass fiber-containing relatively low molecular weight polyester.

95.79 parts by weight of a low molecular weight polybutylene terephthalate (intrinsic viscosity 0.38 dl/g) of melting point 220° C. and hydroxyl value 14 obtained by polycondensing dimethyl terephthalate with 1,4-butanediol was reacted with 4.21 parts by weight of 4,4'-diphenylmethane diisocyanate at 220° C. to obtain a polymer having an intrinsic viscosity of 0.93 dl/g. To 100 parts by weight of this polymer were added 42.86 parts by weight of 6-mm-long chopped glass fibers treated with a vinylsilane type coupling agent followed by mixing the polymer and glass fibers for 30 seconds. The so obtained mixture was then fed to a vent-equipped full flight-type 65-mm extruder, and pellets were prepared at such an extrusion speed that the dwell time of the starting materials inside the barrel would be 2 minutes. When these pellets were then made into test pieces and measured for their physical properties, the following results were obtained: melting point 223° C., tensile strength 1320 kg/cm², flexural strength 1940 kg/cm², notched Izod impact strength 9.0 kg-cm/cm, and flexural strength retention after 14 days at 155° C. 98%.

EXAMPLE 1

To 100 parts by weight of the polymer of intrinisic viscosity 0.93/dl/g used in Referential Example were added 20 parts by weight of a brominated epoxy compound (average degree of polymerization n=4, bromine content 52 weight %) of the formula

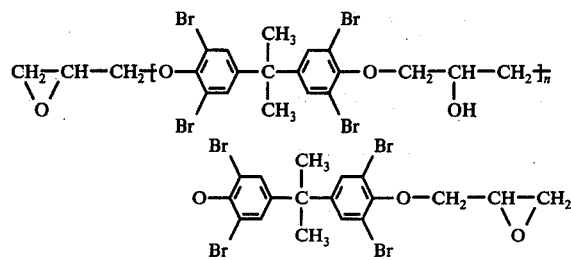

6 parts by weight of antimony trioxide and 54 parts by weight of 6-mm-long chopped glass fibers treated with a vinylsilane type coupling agent, following which the mixture was mixed for 30 seconds. Pellets were then prepared under identical conditions as in Referential Example and measured for their physical properties, with the following results: melting point 222° C., tensile strength 1380 kg/cm², flexural strength 1980 kg/cm², notched Izod impact strength 8.9 kg-cm/cm, and flexural strength retention after 14 days at 155° C. 96%. There was noted no decline in the physical properties as compared with the non-flame retardant composition of Referential Example. Further, there was noted no bleeding (emergence to the surface of the shaped article) at all of the flame retarding agent in the shaped article after 14 days at 155° C. Further, the flammability in accordance with the method of subject 94 of the Underwriters' Laboratories (UL 94) (1/16 inch) was UL 94V-O. On the other hand, when the crushed shaped article was submitted to Soxhlet extraction under reflux with toluene until a constant weight was reached, the amount extracted of the brominated epoxy compound was an exceedingly small amount of 0.55 part by weight as compared with the 20 parts by weight, the amount in which it was used.

CONTROL 1

Pellets were prepared by operating exactly as in Example 1 but using 20 parts by weight of hexabromobenzene, a so-called additive type flame retarding agent, instead of 20 parts by weight of the brominated epoxy compound as the flame retarding agent. When the so obtained pellets were tested as in Example 1, the flame retardancy (1/16 inch) was UL 94V-O, but the mechanical strengths and heat resistance were extremely poor, when compared with those of Example 1, as indicated by the following results: tensile strength 1150 kg/cm², flexural strength 1550 kg/cm², notched Izod impact strength 5.8 kg-cm/cm, and flexural strength retention after 14 days at 155° C. 52%. Further, there was noted after 14 days at 155° C. a bleeding at the surface of the shaped article of the hexabromobenzene, the flame retarding agent.

CONTROL 2

Pellets were prepared by operating exactly as in Example 1, except that 100 parts by weight of polybutylene terephthalate not modified by a polyfunctional isocyanate and of hydroxyl value 3 and intrinsic viscosity 0.92 dl/g was used instead of 100 parts by weight of the polymer of intrinsic viscosity 0.93dl/g used therein. When the so obtained pellets are tested as in Example 1, the flame retardancy (1/16 inch) was UL 94-0, but the mechanical strengths and heat resistance were poor, when compared with those of Example 1, as indicated by the following results: tensile strength 1210 kg/cm², flexural strength 1750 kg/cm$^2$, notched Izod impact strength 6.3 kg-cm/cm, flexural strength after 14 days at 155° C. 76%. Further, when the pellets were extracted with toluene by the Soxhlet method, 17.6 parts by weight of the 20 parts by weight of the brominated epoxy compound used was extracted. Hence, it was noted that there was hardly no reaction of the epoxy compound.

EXAMPLE 2

Ten parts by weight of the brominated epoxy compound used in Example 1, 48 parts by weight of 6-mm-long chopped glass fibers treated with a vinylsilane type coupling agent and 2 parts by weight of antimony trioxide were added to 100 parts by weight of the polymer of intrinsic viscosity 0.93 dl/g used in Example 1, and pellets were prepared by operating exactly as in Example 1. When the so obtained pellets were then tested as in Example 1, the flame retardancy (⅛ inch) was UL 94V-O, the tensile strength was 1340 kg/cm$^2$ and the notched Izod impact strength was 9.0 kg-cm/cm. Further, when the pellets were extracted with toluene by the Soxhlet method, only 0.28 part by weight of the 10 parts by weight of the brominated epoxy compound used was extracted. Thus, the results were the same as in the case of Example 1 even though the amount used of the brominated epoxy compound was reduced.

EXAMPLE 3

Example 1 was repeated but using a barrel temperature of 220° C. and a dwell time of the starting materials of 5 minutes in the step of preparing the pellets using a 65-mm extruder. When the so obtained pellets were tested as in Example 1, the flame retardancy (1/16 inch) was UL 94V-O, the tensile strength was 1420 kg/cm$^2$ and the notched Izod impact strength was 9.5 kg-cm/cm. Further, when the pellets were extracted with toluene by the Soxhlet method, only 0.18 part by weight of the 20 parts by weight of brominated epoxy compound used was extracted.

EXAMPLE 4

Pellets were prepared by operating exactly as in Example 1 but using instead of 100 parts by weight of the polymer of intrinsic viscosity 0.93 dl/g used therein, 100 parts by weight of a polymer of intrinsic viscosity 0.88 dl/g obtained by reacting 97 parts by weight of a low molecular weight polybutylene terephthalate of instrinsic viscosity 0.51 dl/g and hydroxyl value 9 with 3 parts by weight of 4,4'-diphenylmethane diisocyanate at 240° C. When the resulting pellets were tested as in Example 1, the flame retardancy (1/16 inch) was UL 94V-O, the tensile strength was 1300 kg/cm$^2$, the flexural strength was 1910 kg/cm$^2$ and the notched Izod impact strength was 8.5 kg-cm/cm. Further, when the pellets were extracted with toluene by the Soxhlet method, 0.63 part by weight of the 20 parts by weight of the brominated epoxy compound used was extracted.

CONTROL 3

Pellets were prepared by operating exactly as in Example 4 but using instead of 100 parts by weight of the polymer of intrinsic viscosity 0.88 dl/g used therein, 100 parts by weight of a low molecular weight polybutylene terephthalate of intrinsic value 0.51 dl/g and hydroxyl value 9 not modified by a polyfunctional isocyanate. When the resulting pellets were tested as in said example, the flame retardancy (1/16 inch) was UL 94V-O, but the mechanical properties were poor in that the tensile strength was 820 kg/cm$^2$ and the flexural strength was 1300 kg/cm$^2$. Further when the pellets were extracted with toluene by the Soxhlet method, 17.1 parts by weight of the 20 parts by weight of the brominated epoxy compound used was extracted.

EXAMPLE 5

Pellets were prepared by operating exactly as in Example 1 but with the further addition of 3 parts by weight of asbestos. When the resulting pellets were then tested as in Example 1, the flame retardancy (1/32 inch) was UL 94V-O, the tensile strength was 1370 kg/cm$^2$, the flexural strength was 1960 kg/cm$^2$, and the flexural strength retention after 14 days at 155° C. was 96%. Further, when the pellets were extracted with toluene by the Soxhlet method, 0.53 part by weight of the 20 parts by weight of the brominated epoxy compound used was extracted. The results show that dripping was prevented by the use of the asbestos and an improvement was noted in the flame retardancy over that of Example 1.

EXAMPLE 6

Pellets were prepared by operating exactly as in Example 1, except that instead of 100 parts by weight of the polymer of intrinsic viscosity 0.93 dl/g used therein 100 parts by weight of a polymer of intrinsic viscosity 0.87 dl/g obtained by reacting 95.32 parts by weight of a low molecular weight polyethylene terephthalate of hydroxyl value 20 with 4.68 parts by weight of 4,4' diphenylmethane diisocyanate was used with a barrel temperature of the extruder of 260° C. When the resulting pellets were then tested as in Example 1, the flame retardancy (1/16 inch) was UL 94V-O, the tensile strength was 1240 kg/cm$^2$ and the notched Izod impact strength was 7.5 kg-cm/cm. Further, when the pellets were extracted with toluene by the Soxhlet method, only 0.36 part by weight of the 20 parts by weight of the brominated epoxy compound used was extracted. The results were thus nearly the same even when a low molecular weight polyethylene terephthalate was used.

EXAMPLE 7

Pellets were prepared by operating exactly as in Example 1, however, without using 54 parts by weight of the glass fibers but using 5 parts by weight of asbestos. The resulting pellets had a flame retardancy (1/32 inch) of UL 94V-O, a flexural strength of 880 kg/cm$^2$, a notched Izod impact strength of 5.9 kg-cm/cm, and a flexural strength retention after 14 days at 155° C. of 94%. Further, when the brominated epoxy compound used was extracted with toluene, only 0.56 part by weight of 20 parts by weight used was extracted. Again, there was no bleeding at all of the flame retarding agent at the surface of the shaped article after 14 days at 155° C.

CONTROL 4

Example 7 was repeated but using instead of the brominated epoxy compound 14.4 parts by weight of tetrabromophthalic anhydride. While the flame retardancy (1/32 inch) of the resulting pellets was UL 94V-O, their mechanical strengths and heat resistance were extremely poor when compared with those of Example 7 in that their flexural strength was 610 kg/cm$^2$, notched Izod impact strength was 4.1 kg-cm/cm, and flexural strength retention after 14 days at 155° C. was 42%.

Further, bleeding of the tetrabromophthalic anhydride, the flame retarding agent, was noted at the surface of the shaped article after 14 days at 155° C.

EXAMPLE 8

To 100 parts by weight of a mixture consisting of 95 parts by weight of a low molecular weight polybutylene terephthalate of intrinsic viscosity 0.36 dl/g and hydroxyl value 15 and 5 parts by weight of 4,4'-diphenylmethane diisocyanate were added 15 parts by weight of a brominated epoxy compound (average degree of polymerization n=6, bromine content 51.5% by weight) of the formula

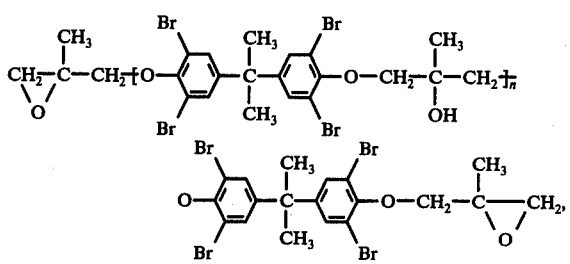

5 parts by weight of antimony trioxide and 50 parts by weight of 6-mm-long chopped glass fiber treated with an aminosilane type coupling agent, and the mixture was mixed for 30 seconds. This was followed by preparing the pellets as in Referential Example and measurement of the physical properties thereof. The flame retardancy (1/16 inch) of the pellets was UL 94V-O, while the tensile strength was 1350 kg/cm$^2$, flexural strength was 1980 kg/cm$^2$, notched Izod impact strength was 8.5 kg-cm/cm, and flexural strength retention after 14 days at 155° C. was 95%. Further, when the pellets were extracted with toluene by the Soxhlet method, 0.65 part by weight of the brominated epoxy compound used was extracted.

EXAMPLE 9

Pellets were prepared by operating exactly as in Example 8, except that the brominated epoxy compound was used in an amount of 20 parts by weight instead of 15 parts by weight, while 50 parts by weight of the glass fibers was not used but 1.5 parts by weight of asbestos and 0.01 part by weight of dibutyltin dilaurate were used. The resulting pellets had a flame retardancy (1/16 inch) of UL 94V-O, a flexural strength of 810 kg/cm$^2$, a notched Izod impact strength of 5.4 kg-cm/cm, and a flexural strength retention after 14 days at 155° C. of 90%. Further, when the brominated epoxy compound used was extracted with toluene, only 0.59 part by weight of the 20 parts by weight used was extracted.

CONTROL 5

Example 8 was repeated but without using 5 parts by weight of the 4,4'-diphenylmethane diisocyanate and 0.01 part by weight of the dibutyltin dilaurate. In this case, however, the melt viscosity of the product was about 2000 centipoises at 250° C., with the consequence that satisfactory test pieces could not be prepared by the use of the usual injection molding machine, and the pieces were extremely fragile. When the brominated epoxy compound used was extracted with toluene, 17.9 parts by weight of the 20 parts by weight used was extracted.

We claim:

1. A process for preparing a flame retardant thermoplastic resin composition which comprises heat mixing and kneading 100 parts by weight of a mixture consisting of a hydroxyl-terminated low molecular weight thermoplastic polyester (A) selected from the group consisting of polyethylene terephthalate, polypropylene terephthalate and polybutylene terephthalate having a hydroxyl value of from 7 to 40 and an intrinsic viscosity, as measured in a 6:4 solvent mixture of phenol and tetrachloroethane at 30° C, of 0.15–0.6 dl/g and a polyfunctional isocyanate (B), or a reaction product of (A) and (B), with 1.5–25 parts by weight, calculated as halogen, of a halogenated epoxy compound of the formula

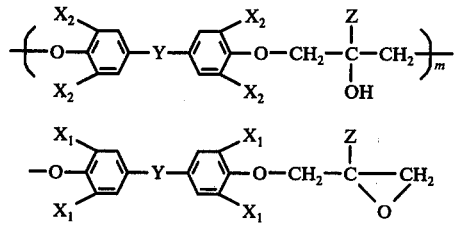

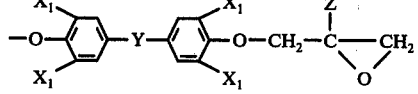

wherein $X_1$ is either hydrogen, chlorine or bromine, with the proviso that when $l$ and $m$ are zero, it is either chlorine or bromine, $X_2$ is either chlorine or bromine, Y is selected from the group consisting of an alkylidene group of 1-6 carbon atoms, cycloalkylidene, —S—, —SO—, —SO$_2$— and —O—, Z is selected from the group consisting of hydrogen or methyl, and $n$ is a number from 0–15, 0.3–15 parts by weight, calculated as antimony, of an antimony compound, 0.10 parts by weight of asbestos, and 0–60% by weight, based on the total weight of the resin composition obtained of glass fibers.

2. The process of claim 1 wherein the amount in which said polyfunctional isocyanate (B) is used relative to 100 parts by weight of said hydroxyl-terminated low molecular weight thermoplastic polyester (A) is calculated as follows:

$$\frac{(0.8 - 2.5) \times \text{(isocyanate equivalent of polyfunctional isocyanate (B))}}{\text{(hydroxyl equivalent of low molecular weight polyester (A))}}$$

× 100 parts by weight.

3. The process of claim 1 wherein said antimony compound is at least one compound selected from the group consisting of antimony trioxide, antimony pentoxide, antimony trisulfide, antimony trichloride, antimony pentachloride, antimony tribromide and antimony pentabromide.

4. The process of claim 1 wherein said glass fibers are used in an amount of 10–60% by weight of the whole composition.

5. The process of claim 1 which comprises carrying out the heat mixing and kneading by means of an extruder with a barrel temperature of 200°–300° C.

6. A flame retardant thermoplastic resin composition produced by the process of claim 1.

7. A shaped article obtained by using the flame retardant thermoplastic resin composition obtained in claim 1.

8. A shaped article obtained by using the flame retardant thermoplastic resin composition obtained in claim 1.

9. A shaped article obtained by using the flame retardant thermoplastic resin composition obtained in claim 2.

10. A shaped article obtained by using the flame retardant thermoplastic resin composition obtained in claim 3.

11. A shaped article obtained by using the flame retardant thermoplastic resin composition obtained in claim 4.

12. A shaped article obtained by using the flame retardant thermoplastic resin composition obtained in claim 5.

13. The process of claim 1 in which the aromatic polyester (A) is polybutylene terephthalate.

14. The process of claim 13 in which the polybutylene terephthalate polyester (A) has an intrinsic viscosity, as measured in a 6:4 solvent mixture of phenol and tetrachloroethylene at 30° C., of 0.25–0.5 dl/g and a hydroxyl value of 9–29.

15. The process of claim 1 in which the polyfunctional isocyanate (B) is a member selected from the group consisting of trimethylene diisocyanate, tetramethylene, diisocyanate, pentamethylene diisocyanate, hexamethylene diisocyanate, heptamethylene diisocyanate, octamethylene diisocyanate, nonamethylene diisocyanate, decamethylene diisocyanate, propane diisocyanate-1,2, butane diisocyanate-1,2, pentane diisocyanate-1,2, pentane diisocyanate-1,3, hexane diisocyanate-1,2, hexane diisocyanate-1,3, hexane diisocyanate-1,4, hexane diisocyanate-1,5, 4-methyl-hexane diisocyanate-1,2, 3-methyl-hexane diisocyanate-1,4, 2-benzyl-propane diisocyanate-1,3, 2,4-diphenyl-hexane diisocyanate-1,6, methylcyclohexane diisocyanate, 4-4'-dicyclohexymethane diisocyanate, isopropylidene bis(4-cyclohexylisocyanate), p-phenyl diisocyanate, 1,4-naphthylene diisocyanate, 1,5-naphthylene diisocyanate, 1,8-naphthylene diisocyanate, 2,6-naphthylene diisocyanate, 1-methyl-phenylene diisocyanate-2,4, 1-methyl-phenylene diisocyanate-2,6, xylylene diisocyanate-1,3, xylylene diisocyanate-1,4, 4,4'-diisocyanate diphenyl ether, 2,2'-diisocyanate diethyl ether, 2,2'-diisocyanate diethyl sulfite, 4,4'diisocyanate diphenylmethane, hydrogenated 4,4'-diisocyanate diphenylmethane and isophorone diisocyanate.

16. The method of claim 1 in which $n$ is a number of from 1–12.

17. The process of claim 16 which comprises heat mixing and kneading 100 parts by weight of the mixture of (A) and (B) or reaction product of (A) and (B) with 3–22 parts by weight of the halogenated epoxy compound.

18. The process of claim 1 in which the asbestos is used in an amount of from 1–7 parts by weight, per 100 parts by weight of the mixture or reaction product of (A) and (B).

19. A flame retardant thermoplastic resin composition produced by the process of claim 1 in which the hydroxylterminated low molecular weight thermoplastic polyester (A) is an aromatic polyester selected from the group consisting of polyethylene terephthalate, polypropylene terephthalate, and polybutylene terephthalate, said polyfunctional isocyanate (B) is selected from the group consisting of trimethylene diisocyanate, tetramethylene diisocyanate, pentamethylene diisocyanate; hexamethylene diisocyanate, heptamethylene diisocyanate, octamethylene diisocyanate, nonamethylene diisocyanate, decamethylene diisocyanate, propane diisocyanate-1,2, butane diisocyanate-1,2, pentane diisocyanate-1,2, pentane diisocyanate-1,3, hexane diisocyanate-1,2, hexane diisocyanate-1,3 hexane diisocyanate-1,4, hexane diisocyanate-1,5, 4-methyl-hexane diisocyanate-1,2,3-methyl-hexane diisocyanate-1,4, 2-benzyl-propane diisocyanate-1,3, 2,4-diphenyl-hexane diisocyanate-1,6, methylcyclohexane diisocyanate, 4,4'-dicyclohexymethane diisocyanate, isopropylidene bis(4-cyclohexylisocyanate), p-phenyl diisocyanate, 1,4-naphthylene diisocyanate, 1,5-naphthylene diisocyanate, 1,8-naphthylene diisocyanate, 2,6-naphthylene diisocyanate, 1-methyl-phenylene diisocyanate-2,4, 1-methylphenylene diisocyanate-2,6, xylylene diisocyanate-1,3, xylylene diisocyanate-1,4, 4,4'-diisocyanate diphenyl ether, 2,2'-diisocyanate diethyl ether, 2,2'-diisocyanate diethyl sulfite, 4,4'-diisocyanate diphenylmethane, hydrogenated 4,4'-diisocyanate diphenylmethane and isophorone diisocyanate, $n$ is a number from 1–12, said antimony compound is at least one compound selected from the group consisting of antimony trioxide, antimony pentoxide, antimony trisulfide, antimony trichloride, antimony pentachloride, antimony tribromide and antimony pentabromide and the amount in which the polyfunctional isocyanate (B) is used relative to 100 parts by weight of the hydroxyl-terminated low molecular weight thermopolyester (A) is calculated as follows:

$$\frac{(0.8-2.5) \times (\text{isocyanate equivalent of polyfunctional isocyanate (B)})}{(\text{hydroxyl equivalent of 100 molecular weight polyester (A)})}$$

20. A flame retardant thermoplastic resin composition produced by the process of claim 1 in which the low molecular weight polyester (A) is polybutylene terephthalate, said polyfunction isocyanate (B) is 4,4'-diphenylmethane diisocyanate, and the antimony compound is antimony trioxide.

* * * * *

UNITED STATES PATENT AND TRADEMARK OFFICE
CERTIFICATE OF CORRECTION

PATENT NO. : 4,105,622
DATED : August 8, 1978
INVENTOR(S) : IZUTU, ET AL.

It is certified that error appears in the above-identified patent and that said Letters Patent are hereby corrected as shown below:

Claim 1, line 15, insert --

--

Signed and Sealed this

Sixth Day of February 1979

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,105,622
DATED : August 8, 1978
INVENTOR(S) : IZUTU, ET AL.

It is certified that error appears in the above-identified patent and that said Letters Patent are hereby corrected as shown below:

Claim 1, column 14, line 33 delete "0.10" and insert -- 0-10 --

Signed and Sealed this

Twenty-sixth Day of February 1980

[SEAL]

Attest:

SIDNEY A. DIAMOND

Attesting Officer  Commissioner of Patents and Trademarks